No. 630,842. Patented Aug. 15, 1899.
W. H. BAKER.
PROCESS OF SEPARATING PRECIOUS METALS FROM ORES.
(Application filed Mar. 5, 1898.)

(No Model.) 5 Sheets—Sheet 1.

No. 630,842. Patented Aug. 15, 1899.
W. H. BAKER.
PROCESS OF SEPARATING PRECIOUS METALS FROM ORES.
(Application filed Mar. 5, 1898.)
(No Model.) 5 Sheets—Sheet 2.

WITNESSES:

INVENTOR
W. H. Baker
BY
ATTORNEYS.

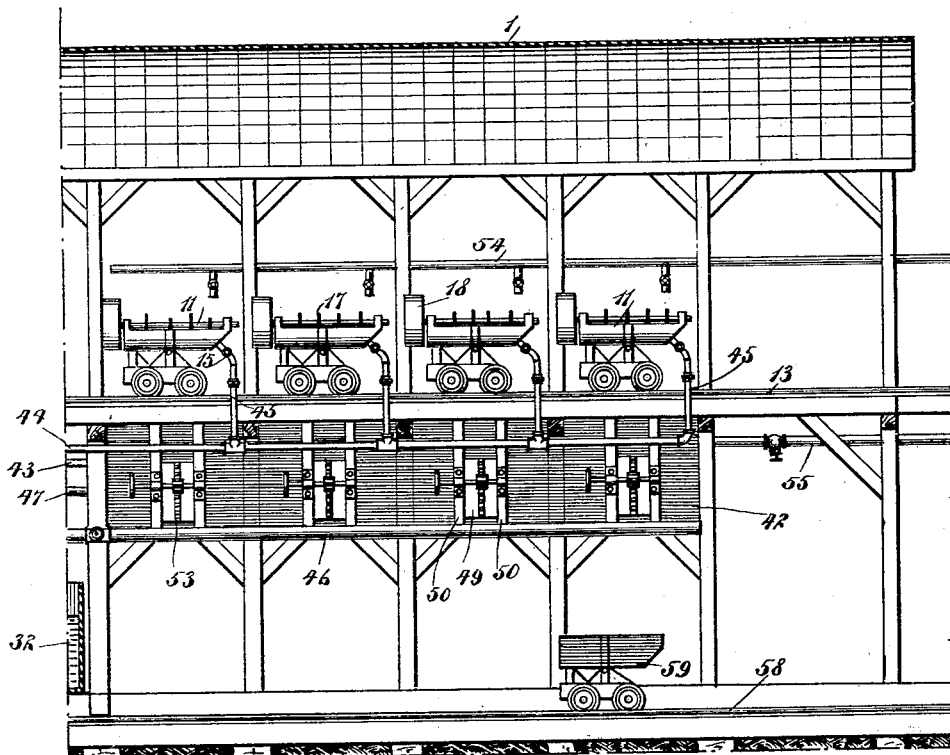

No. 630,842. Patented Aug. 15, 1899.
W. H. BAKER.
PROCESS OF SEPARATING PRECIOUS METALS FROM ORES.
(Application filed Mar. 5, 1898.)

(No Model.) 5 Sheets—Sheet 4.

No. 630,842. Patented Aug. 15, 1899.
W. H. BAKER.
PROCESS OF SEPARATING PRECIOUS METALS FROM ORES.
(Application filed Mar. 5, 1898.)
(No Model.) 5 Sheets—Sheet 5.

WITNESSES:
INVENTOR
W. H. Baker
BY
ATTORNEYS.

UNITED STATES PATENT OFFICE.

WILLIAM H. BAKER, OF DEADWOOD, SOUTH DAKOTA, ASSIGNOR OF ONE-HALF TO ALVIN CLARK, OF DEVILS LAKE, NORTH DAKOTA.

PROCESS OF SEPARATING PRECIOUS METALS FROM ORES.

SPECIFICATION forming part of Letters Patent No. 630,842, dated August 15, 1899.

Application filed March 5, 1898. Serial No. 672,681. (No specimens.)

*To all whom it may concern:*

Be it known that I, WILLIAM H. BAKER, of Deadwood, in the county of Lawrence and State of South Dakota, have invented a new and Improved Process of Separating Precious Metals from Ores, of which the following is a full, clear, and exact description.

This invention relates to improvements in means for recovering gold and silver from silicious and refractory ores, earth, &c.; and the object of the invention is to provide means whereby the gold and silver may be rapidly dissolved as they exist in silicious and refractory ores, earth, &c., by applying hot alkaline and cyanid-of-potassium solutions and recovering an equivalent of the metals from the solutions by the same energy at the same moment without the use of zinc or other precipitating agencies.

Reference is to be had to the accompanying drawings, forming a part of this specification, in which similar characters of reference indicate corresponding parts in all the views.

Figure 1A:
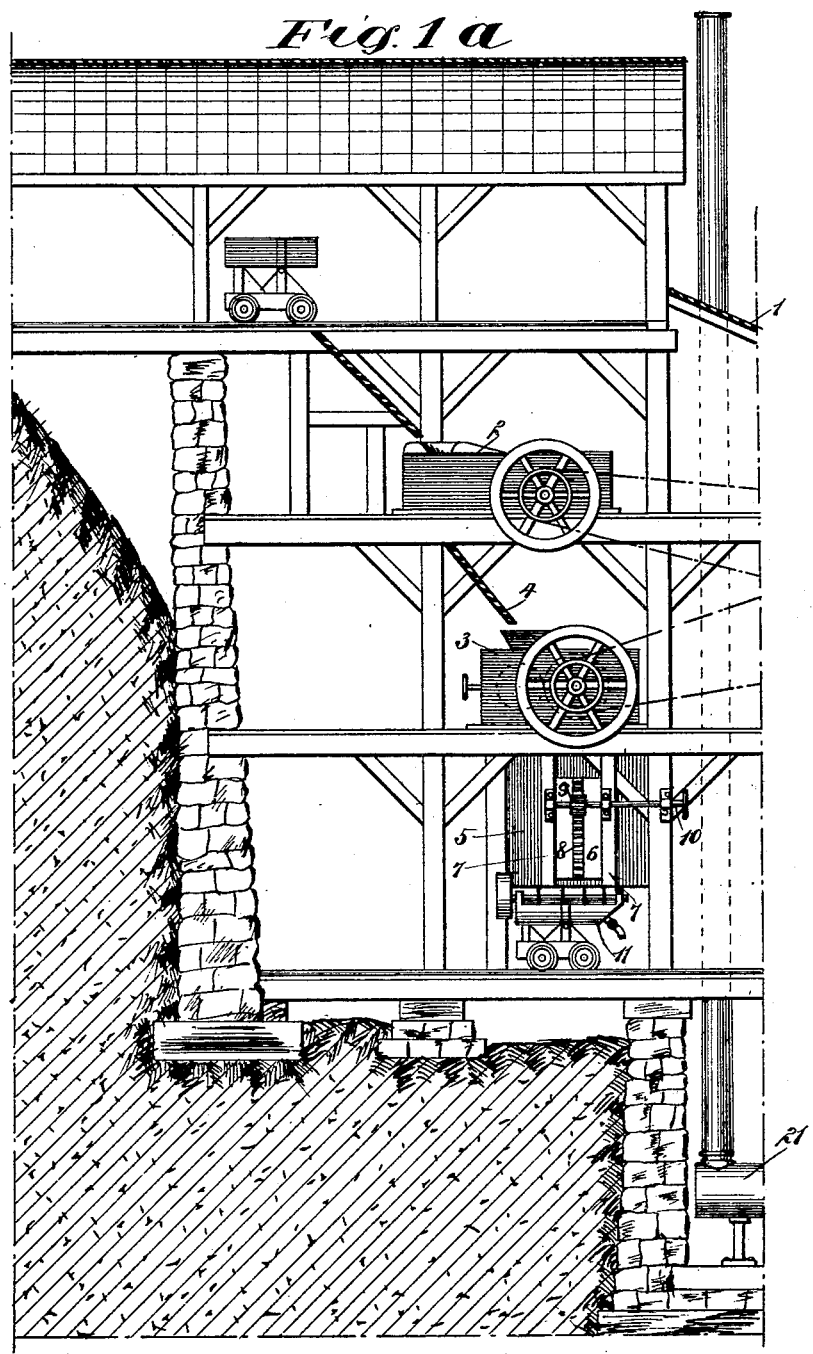
Figure 1B:
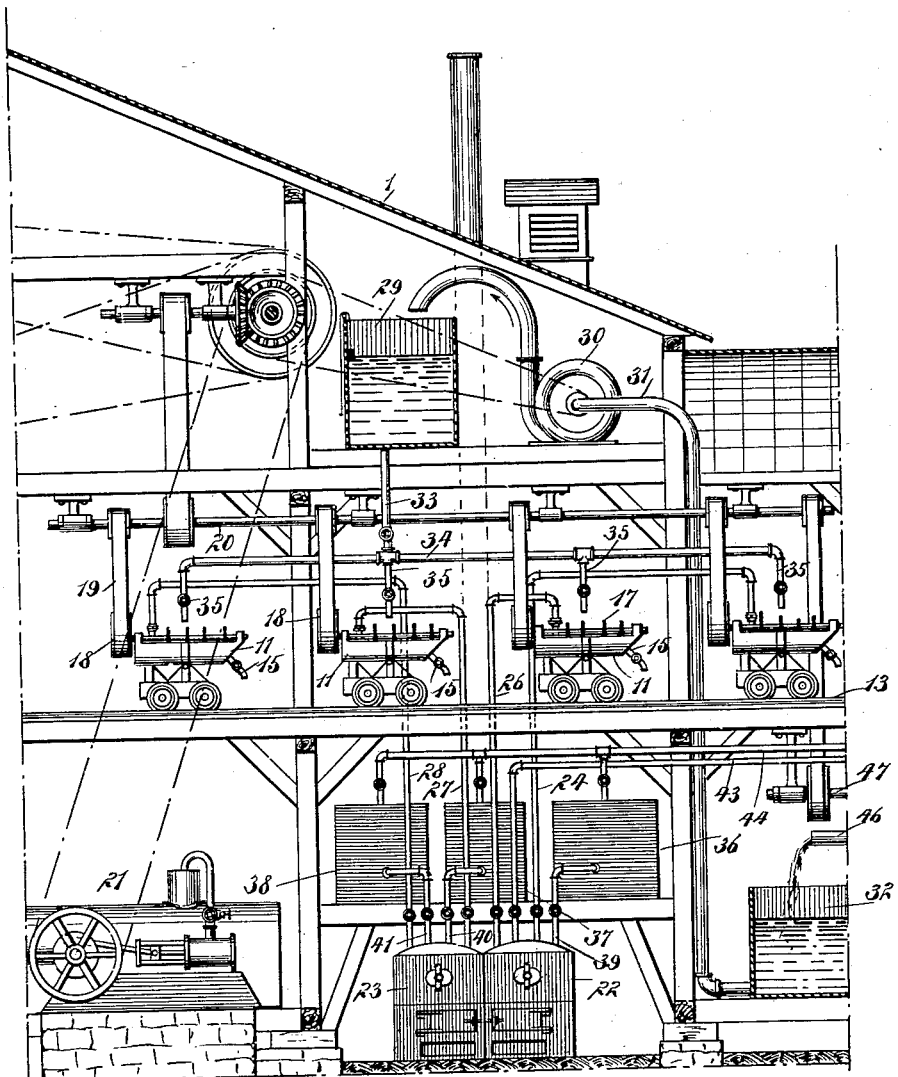
Figure 2:
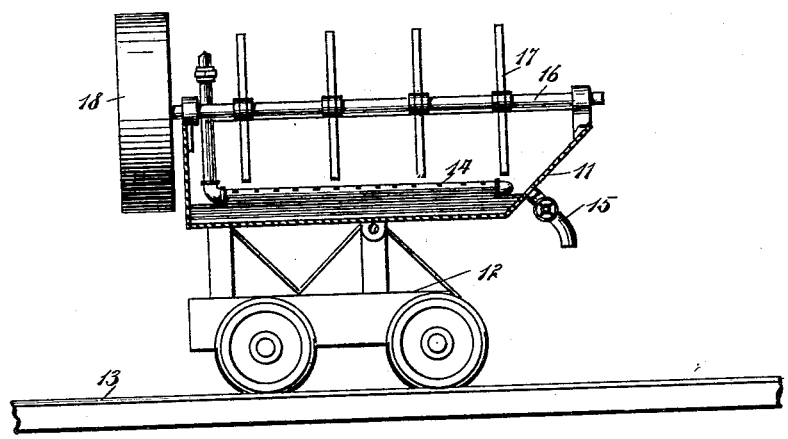
Figure 3:
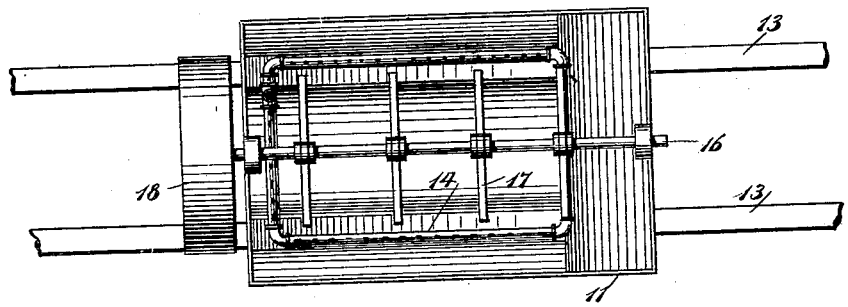
Figure 4:
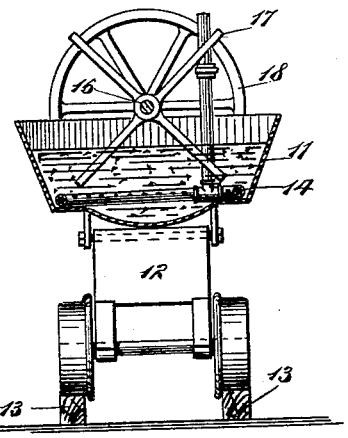
Figure 5:
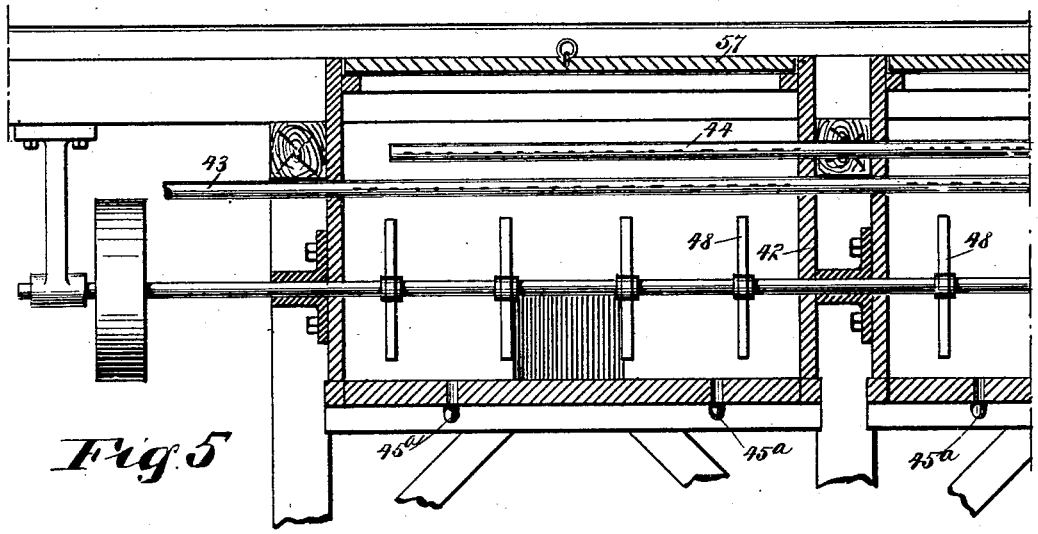
Figure 6:
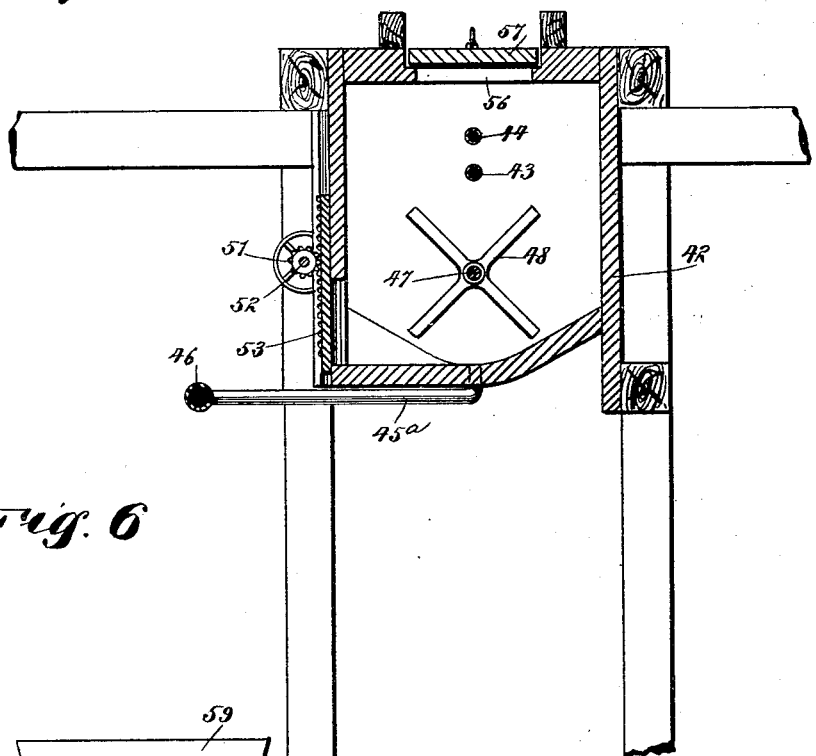

Figures 1$^a$, 1$^b$, and 1$^c$ show in side elevation an apparatus by means of which my process may be carried out. Fig. 2 is a partial section and partial elevation of a movable tank employed. Fig. 3 is a top plan view thereof. Fig. 4 is a transverse section thereof. Fig. 5 is a longitudinal section of tailings-bins employed, and Fig. 6 is a transverse section thereof.

The whole apparatus is arranged in a suitable building 1. In one end of this building is an ore-crusher 2, and below this crusher is a pulverizer 3. The crushed ore from the crusher 2 may run over an incline 4 into the hopper of the pulverizer, and the pulverized material will fall into a casing 5, having a gate 6, movable vertically in guides 7. As a means of moving this gate vertically I provide it with a rack 8, engaged by a pinion 9 on a shaft 10. By opening this gate the pulverized material may be discharged into a movable tank 11.

The tank 11 preferably has a concave bottom and is mounted to swing on a truck 12, designed to be moved along the rails 13. Arranged in the lower portion of the tank 11 is a steam-pipe 14, having a series of perforations for the discharge of steam into the pulp in the tank. The tank 11 also has a valve-controlled outlet 15, and extended longitudinally of the tank is a shaft 16, on which beater-arms 17 are mounted. A band-wheel 18 on one end of the shaft 16 is designed to be engaged by a band 19, extended from a pulley on a shaft 20, which is driven by suitable connections with an engine 21. I have here shown two sets of these movable tanks 11, each set consisting of four tanks; but it is obvious that a greater or less number may be employed. The object of employing two series of movable tanks is so that a certain operation, to be hereinafter described, may take place in one set while another operation is taking place in the other set.

Arranged in the lower portion of the building are steam-boilers 22 23. From the steam-boiler 22 valve-controlled steam-pipes 24 and 26 extend upward and are adapted for connection with the steam-pipes of two of the tanks 11, and from the boiler 23 pipes 27 and 28 extend upward and are adapted for connection with the steam-pipes of the other two tanks of the series.

Arranged in the upper portion of the building and above the first series of tanks is a solution-tank 29. A solution is discharged into the tank 29 by means of a centrifugal pump 30, which has a pipe connection 31 with an auxiliary solution-tank 32. From the bottom of the tank 29 a valve-controlled pipe 33 leads to a horizontal pipe 34, having branches 35, designed to discharge solution into the four tanks 11.

Arranged above the boilers 22 23 is a series of settling-tanks 36, 37, and 38. The settling-tank 36 has a valve-controlled pipe connection 39 with the boiler 22, and the tanks 37 and 38 have connections 40 and 41, respectively, with the boiler 23. The four tanks 11 which are receiving the solution I shall term the "first series." While the material is being operated upon in the first series of tanks, the second series of tanks will be placed over the tailings-bins 42. A steam-pipe 43 leads from the boiler 22 through the several tailings-bins 42, and a portion of this pipe 43 within the bins is perforated, so that steam may be discharged on the material therein, as will be hereinafter described. A pipe 44 has branches 45, adapted for connection with the outlets 15 of the tanks 11, and this pipe 44 has branch connections leading into the tanks 36, 37, and 38. Each bin 42 has a pipe connection 45ª with a discharge-pipe 46 for discharging the solution into the auxiliary tank 32. A shaft 47 extends through the several bins, and attached to said shaft, within each bin, are beater-arms 48. A gate 49 controls the discharge-opening of each bin. As here shown, these gates are movable in guides 50 and by means of a pinion 51 on a shaft 52 engaging with a rack 53 on the gate.

A pipe 54 is arranged above the second series of tanks 11 and is designed to discharge water into said second series of tanks, and a water-supply pipe 55 leads through the several bins 42, so that water may be discharged therein. The pipes 54 and 55 may receive water from any suitable source. Each bin 42 has an opening 56 through its upper wall, normally closed by a lid 57, and below the bins is a track 58, on which a dumping-car 59 is movable. This dumping-car 59 is designed to receive the tailings from the bins.

In operation the first series of tanks 11 are each half filled with pulp, and then they are moved to a position to make the connections with the steam-pipes leading from the boilers. I then add or discharge into each tank one cubic foot of solution from the tank 29 to every three cubic feet of pulp in the tank. Then the stirring apparatus is set in operation, while the steam is turned on from the boilers. The boiling and agitation are continued for three hours. The evaporation by that time nearly equals the amount of solution added to the tanks. As evaporation takes place in the tanks, so also does the evaporation take place in the boilers. Consequently the boilers supply an equivalent, as the superficial area of the boilers is equal to the area of the four tanks, and the escape and replacement in the tanks are equal. I therefore hold the solutions in the tanks during the treatment of the pulp of uniform strength, which is very important.

The metals are recovered by evaporating to dryness. Therefore the solutions in the boilers containing gold and silver are constantly being concentrated. After the three hours' agitation the tanks are detached from the pipe connections and pushed forward and another set of tanks placed and the same operation is performed. After this above-stated treatment the several tanks are moved over the bins 42, and the solution from this first set of tanks is drawn off, wash-water added and also drawn off and returned to the tanks 36, 37, and 38, where it is allowed to settle, and the solution returned to the boilers 22 and 23 through the pipe connections with the settling-tanks. The tailings in the tanks are dumped into the bins and water is forced into said bins—that is, as much water as equals the solution drawn off. Steam from the boilers is supplied and the stirrers in the bins are put in operation, and this is continued for nine hours.

It may be here stated that each bin is designed to hold the contents of four tanks 11. The solution is drawn off from the bins, and wash-water is added and also drawn off and returned to the tank 32, from which it is pumped unfiltered to the tank 29, where it is strengthened by adding cyanid of potassium and is used over again. The wash-waters and solutions from the tank 32 contain a certain amount of gold and silver recovered from the tailings, and it is added to fresh pulp. As the solution in the tank 29 is derived from the tailings, it contains the metals of the tailings. Cyanid of potassium is added until the solution contains seven to ten pounds free cyanid to every two thousand pounds of the solution and it is then ready for use on fresh pulp. The values in the solutions, added to the amount recovered in three hours' treatment and drawn off, equal the free values recovered in the pulp, and average about eighty per cent. of the value in the ore. In fact, by my treatment I have recovered as high as ninety-four per cent. of the fire assay.

The solutions in the boilers when they become heavily charged with the metals are to be evaporated to complete dryness, the residue fused to a red heat and allowed to cool, the saline mass dissolved with water, thus recovering the residue, which is the gold and silver, in a porous state. The water may contain a little gold and silver and should be added to fresh pulp for the treatment first described.

Having thus described my invention, I claim as new and desire to secure by Letters Patent—

1. The process of separating precious metals from their ores, consisting in first pulverizing the ores, then subjecting the same to agitation and to a bath of boiling cyanid-of-potassium solution, keeping the solution of uniform strength during the treatment, separating the solution from the ore, and subsequently evaporating the same and calcining the residue to recover the metal.

2. The process herein described of separating precious metals from ores, consisting in subjecting the pulverized ore to the action of a cyanid-of-potassium solution, keeping the solution of uniform strength during the treatment, admitting steam to the mass to raise the solution to the boiling-point, and then agitating the mass as set forth.

3. The process herein described of separating precious metals from ores, consisting in subjecting the pulverized ore to the action of a cyanid-of-potassium solution keeping the solution of uniform strength during the treatment, admitting steam to the mass to raise the solution to the boiling-point, agitating the mass, separating the solution from the ore, and then evaporating the solution, as set forth.

4. The process herein described of separating precious metals from ores, consisting in subjecting the ore to the action of a cyanid-of-potassium solution, admitting steam to the mass to heat the same, separating the solution, and utilizing the same for the generation of steam to heat the mass, as set forth.

5. The process herein described of separating precious metals from ores, consisting in subjecting the pulverized ore to the action of a boiling solution of cyanid of potassium, agitating the mass, separating the solution from the tailings, subjecting the tailings to which water has been added to the action of heat while being agitated, separating the solution, adding a fresh supply of water to the tailings and then separating the resultant solution and utilizing the same in the treatment of a fresh supply of ore, as set forth.

6. The process herein described of separating precious metals from ores, consisting in subjecting the ore to the action of a cyanid-of-potassium solution, admitting steam to the mass to bring it to the boiling-point, agitating the same, separating the solution, adding water to the tailings and then utilizing the resultant solution after settling for the generation of steam to heat the cyanid-of-potassium solution, as set forth.

7. The herein-described process of separating precious metals from ores, consisting in subjecting the ore to the action of a cyanid-of-potassium solution, admitting steam to the mass to bring it to the boiling-point, agitating the same, separating the solution, adding water to the tailings, utilizing the resultant solution for the generation of steam to heat the cyanid-of-potassium solution, subjecting the tailings to which water has been added to the action of heat while being agitated, separating the solution, adding more water to the tailings and then separating the resultant solution and utilizing the same in the treatment of a fresh supply of ore, as set forth.

8. The process herein described of separating precious metals from ores, consisting in subjecting the ore to the action of cyanid-of-potassium solution, admitting steam to the mass to heat the same, separating the solution from the tailings, and subjecting the solution to the action of heat to evaporate the same, and at the same time generate steam to be used in the heating a subsequent mass of ore and cyanid of potassium, as set forth.

9. The process herein described of separating precious metals from ores, consisting in subjecting the crushed ore to the action of cyanid solution, agitating the mass, admitting steam to the mass to heat the same to the boiling-point, separating the solution from the tailings, washing the tailings, and then subjecting the solution and the solution resulting from the washing to the action of heat to evaporate the same and at the same time generate steam to be used in heating a subsequent mass of ore and cyanid of potassium.

WILLIAM H. BAKER.

Witnesses:
JAMES T. GILLMORE,
MARTIN ALBER.